UNITED STATES PATENT OFFICE.

DENNIS RICHERD ROBERTSON, OF DENVER, COLORADO.

PROCESS FOR EXTRACTING METALS.

No. 886,866.   Specification of Letters Patent.   Patented May 5, 1908.

Application filed September 22, 1906. Serial No. 335,344.

*To all whom it may concern:*

Be it known that I, DENNIS RICHERD ROBERTSON, a citizen of the United States, and a resident of Denver, in the county of Denver and State of Colorado, have invented certain new and useful Improvements in a Process for Extracting Metals, of which the following is a full, clear, and exact description.

My invention relates to the extraction of metals from substances containing them, and more particularly to the separation of so-called precious metals, and particularly to the separation of gold, silver and copper from their ores.

By my process I can separate two or more metals from the same ore and at the same time. For gold, or for gold and copper, as the case may be, I select one ton of crude ore and add thereto two gallons of aqua regia, together with just enough water to reduce the mass to the consistency of soft mud. I agitate this mass and apply steam to it for a period of about two hours, gradually bringing it to the boiling point. Before admixing the ore I reduce it to about eighty mesh. After the agitation of two hours and after bringing the pulp to the boiling point I add about enough cold water to equal thirty per cent. of the weight of the mass. I next drain the admixture through a filter into a precipitating tank. I then throw about twenty pounds of old scrap iron or iron rust into the precipitating tank and maintain the temperature of the precipitating tank at about sixty-five to seventy degrees Fahrenheit, for a sufficient length of time to enable the liquid to become clear. The values adhere to the iron or the iron oxid and are found to be pure. They are removed by simply scaling them off. The liquid can then be drained off or thrown away, as may be desired. I find that it can be used again repeatedly, with little or no impairment of its efficiency.

I find the process above described to be very economical. It is certainly very simple and cheap, the results are quickly obtained, and the process may be carried out by persons possessing no special skill. I also find that no question as to the grade of the ore need be considered, for the reason that the process can be used with either high or low grade ores. In case of the softer ores, however, the expense is comparatively less, as these ores yield more quickly to the treatment.

Having thus described my invention, I claim as new and desire to secure by Letters Patent:—

1. The herein described process of extracting gold, or gold and copper from ores containing the same, which consists in adding to the partially pulverized crude ore aqua regia, agitating and applying steam to the mass until it is brought to the boiling point, and adding twenty per cent. of cold water, filtering, and adding iron to the filtrate, while retaining the mixture at approximately 70°.

2. The herein described process of extracting gold, or gold and copper from ores containing the same, which consists in adding to the partially pulverized crude ore aqua regia, boiling the mass, adding cold water, filtering, adding iron to the filtrate, and finally separating the metals from the iron.

In testimony whereof I have signed my name to this specification in the presence of two subscribing witnesses.

DENNIS RICHERD ROBERTSON.

Witnesses:
 EDWIN VAN CISE,
 PATTIE DENNE.